United States Patent
Longdill et al.

(10) Patent No.: US 7,856,810 B2
(45) Date of Patent: *Dec. 28, 2010

(54) EXHAUST COOLING SYSTEM OF AN AMPHIBIOUS VEHICLE

(75) Inventors: Simon James Longdill, Auckland (NZ); Hans Weekers, Auckland (NZ); Stephen John Briggs, Auckland (NZ)

(73) Assignee: Gibbs Technologies Ltd, Warwickshire (GB)

(*) Notice: Subject to any disclaimer, the term of this patent is extended or adjusted under 35 U.S.C. 154(b) by 794 days.

This patent is subject to a terminal disclaimer.

(21) Appl. No.: 11/288,871

(22) Filed: Nov. 28, 2005

(65) Prior Publication Data

US 2007/0119157 A1 May 31, 2007

(30) Foreign Application Priority Data

Nov. 29, 2004 (GB) .................................. 0426179.8

(51) Int. Cl.
*F01N 3/00* (2006.01)

(52) U.S. Cl. .................. 60/298; 60/272; 60/302; 60/320; 60/321; 440/12.5; 440/88 G; 440/88 J; 440/88 HE; 440/89 B; 440/89 C; 440/89 H (58) Field of Classification Search .............. 60/272, 60/298, 299, 302, 315, 320, 321, 324; 440/12.5, 440/12.51, 88 C, 88 D, 88 G, 88 J, 88 HE, 440/89 A, 89 B, 89 C, 89 H, 89 J, 89 R
See application file for complete search history.

(56) References Cited

U.S. PATENT DOCUMENTS

| | | | | |
|---|---|---|---|---|
| 3,435,798 A | * | 4/1969 | Rieli | ................ 440/12.66 |
| 3,884,194 A | | 5/1975 | Grosseau | |
| 4,535,862 A | * | 8/1985 | LeBlanc | .................. 180/68.1 |
| 4,565,175 A | | 1/1986 | Kaye | |
| 4,611,466 A | * | 9/1986 | Keedy | .................... 60/714 |
| 4,711,088 A | | 12/1987 | Berchem | |
| 4,991,546 A | | 2/1991 | Yoshimura | |
| 4,998,510 A | | 3/1991 | Rognon | |
| 5,148,675 A | | 9/1992 | Inman | |
| 5,343,699 A | * | 9/1994 | McAlister | .................... 60/273 |
| 5,417,177 A | | 5/1995 | Taguchi et al. | |
| 5,785,030 A | * | 7/1998 | Paas | ...................... 60/278 |
| 6,151,891 A | * | 11/2000 | Bennett | .................... 60/298 |
| 6,273,033 B1 | | 8/2001 | Enander et al. | |
| 6,276,327 B1 | | 8/2001 | Fukuoka et al. | |

(Continued)

FOREIGN PATENT DOCUMENTS

GB 1305292 1/1973

(Continued)

*Primary Examiner*—Binh Q. Tran
(74) *Attorney, Agent, or Firm*—Fulwider Patton LLP (57) ABSTRACT

An exhaust cooling system of an amphibious vehicle operable in land and marine modes comprises an exhaust system to be cooled, at least one air-liquid heat exchanger, and coolant liquid in thermal communication with the exhaust system to be cooled and the air-liquid heat exchanger(s) and heated by the exhaust system. When the amphibious vehicle is operated, the coolant liquid is cooled by the air-liquid heat exchanger(s). Optionally, at least one liquid-liquid heat exchanger may be provided and the coolant liquid cooled by the liquid-liquid heat exchanger(s). The vehicle may plane, and have retractable road wheels. The air-liquid heat exchanger(s) may be mounted at the front or rear of the vehicle, or elsewhere.

41 Claims, 6 Drawing Sheets

U.S. PATENT DOCUMENTS

| | | | |
|---|---|---|---|
| 6,358,109 B1 * | 3/2002 | Neisen | 440/89 R |
| 6,360,532 B2 * | 3/2002 | Strahle et al. | 60/321 |
| 6,394,057 B1 | 5/2002 | Fukuoka et al. | |
| 6,505,466 B1 | 1/2003 | Nagafusa et al. | |
| 6,820,419 B2 * | 11/2004 | Ford et al. | 60/310 |
| 6,951,492 B2 * | 10/2005 | Gibbs | 440/88 C |
| 2004/0060283 A1 | 4/2004 | Lee | |

FOREIGN PATENT DOCUMENTS

| | | |
|---|---|---|
| GB | 2093119 A | 8/1982 |
| SU | 0740537 | 6/1980 |
| WO | WO 03/093037 | 11/2003 |

* cited by examiner

EXHAUST COOLING SYSTEM OF AN AMPHIBIOUS VEHICLE

CROSS-REFERENCES TO RELATED APPLICATIONS

This application claims priority from Great Britain Application Serial No. 0426179.8, filed Nov. 29, 2004.

BACKGROUND OF THE INVENTION

The present invention relates to an exhaust cooling system of an amphibious vehicle.

In the case of dedicated land vehicles and marine vessels known in the art, the apparatus and methods employed for cooling exhaust systems are well established. In the case of a land vehicle, the exhaust system is typically slung below the floor panel of the vehicle such that it is exposed to ambient atmospheric air which passes over and cools external surfaces of the exhaust system. The cooling effect achieved is of course variable but satisfactory, being largely dependent upon factors such as vehicle speed and atmospheric conditions. In the case of marine vessels, it is usual to cool exhaust systems with water. This is normally achieved using the abundant resource of raw water outside the vessel which is drawn in and circulated around a water jacket enclosing the exhaust system and then exhausted back to the raw water source. Such exhaust cooling systems are highly efficient when the marine vessel is on water, but do not function when on land where the raw water source is no longer available. However, this is not particularly important for a marine vessel whose engine will only rarely be run on land, if at all (typically only for maintenance reasons where an artificial raw water source may be provided, e.g. via a hosepipe).

It is also known from U.S. Pat. No. 3,884,194 of Citroen to provide a water jacket for an exhaust manifold of an air cooled engine used in a land vehicle in order to recover heat energy. In particular, U.S. Pat. No. 3,884,194 discloses a steam generator used for heating the passenger compartment of vehicles equipped with air cooled engines.

In U.S. Pat. No. 4,991,546 of Sanshin Kogyo Kabushiki Kaisha, there is disclosed a water jacket based cooling system for marine watercraft used to cool both the internal combustion engine and exhaust manifold. The invention is concerned with preventing condensation forming in the exhaust manifold as a result of the cooling process. Raw water is used, this being sourced from outside the watercraft and is returned after circulation around the various water jackets of the system. In one embodiment, a supplementary radiator is used, but only for the purpose of providing a sealed cooling jacket for the engine, exhaust manifold and a portion of an exhaust elbow so that a coolant other than pure water may be employed in a closed system and kept separate from the raw water. Raw water is still required to be sourced, circulated and returned to the body of water outside of the watercraft. As such, this system cannot be employed in a land vehicle.

In the case of an amphibious vehicle, however, the problems of cooling of an exhaust system present quite unique problems and considerations. An amphibious vehicle is used extensively on land and on water and its exhaust system is liable to run at least as hot as that of any other road vehicle. Whereas land vehicles rely on the surrounding air to keep their exhaust systems cool, especially catalytic converters which have been known to run so hot (~900° C.) as to ignite grass underneath parked vehicles, the underside of an amphibious vehicle is sealed to ensure buoyancy and hydrodynamic performance on water. This compounds the problem of providing adequate cooling since sealing the exhaust system inside the hull actually serves to insulate it from external cooling influences. Furthermore, it is desirable to seal in the exhaust system of an amphibious vehicle since there exists the potential for damaging thermal shock effects of quenching when a fully heated exhaust system which has been operating in land mode enters the water for the vehicle to operate in marine mode. Also, the catalytic converter is a very sensitive item which must be maintained at its optimum operating temperature to prevent damage to the catalyst. It is clear therefore that an amphibious vehicle presents conflicting requirements and dedicated prior art systems are poorly suited to the requirements of an amphibious vehicle.

SUMMARY OF THE INVENTION

The present invention provides, in a first aspect, an exhaust cooling system of an amphibious vehicle operable in land and marine modes, the exhaust cooling system comprising:

an exhaust system to be cooled;
at least one air-liquid heat exchanger; and
a first coolant liquid in thermal communication with the exhaust system and the at least one air-liquid heat exchanger, wherein:
when the amphibious vehicle is operated the first coolant liquid is heated by the exhaust system and cooled by the at least one air-liquid heat exchanger.

In a second aspect, the present invention provides an exhaust cooling system of an amphibious vehicle operable in land and marine modes, the exhaust cooling system comprising:

an exhaust system to be cooled;
at least one liquid-liquid heat exchanger; and
a first coolant liquid in thermal communication with the exhaust system and the at least one liquid-liquid heat exchanger, wherein
when the amphibious vehicle is operated the first coolant liquid is heated by the exhaust system and cooled by the at least one liquid-liquid heat exchanger.

These and other features and advantages of the present invention will become apparent from the following detailed description of the preferred embodiments which, taken in conjunction with the accompanying drawings, illustrate by way of example the principles of the invention.

BRIEF DESCRIPTION OF THE DRAWINGS

Preferred embodiments of the present invention will now be described by way of example only with reference to the accompanying drawings, in which.

DETAILED DESCRIPTION OF THE PREFERRED EMBODIMENTS

Figure 1:
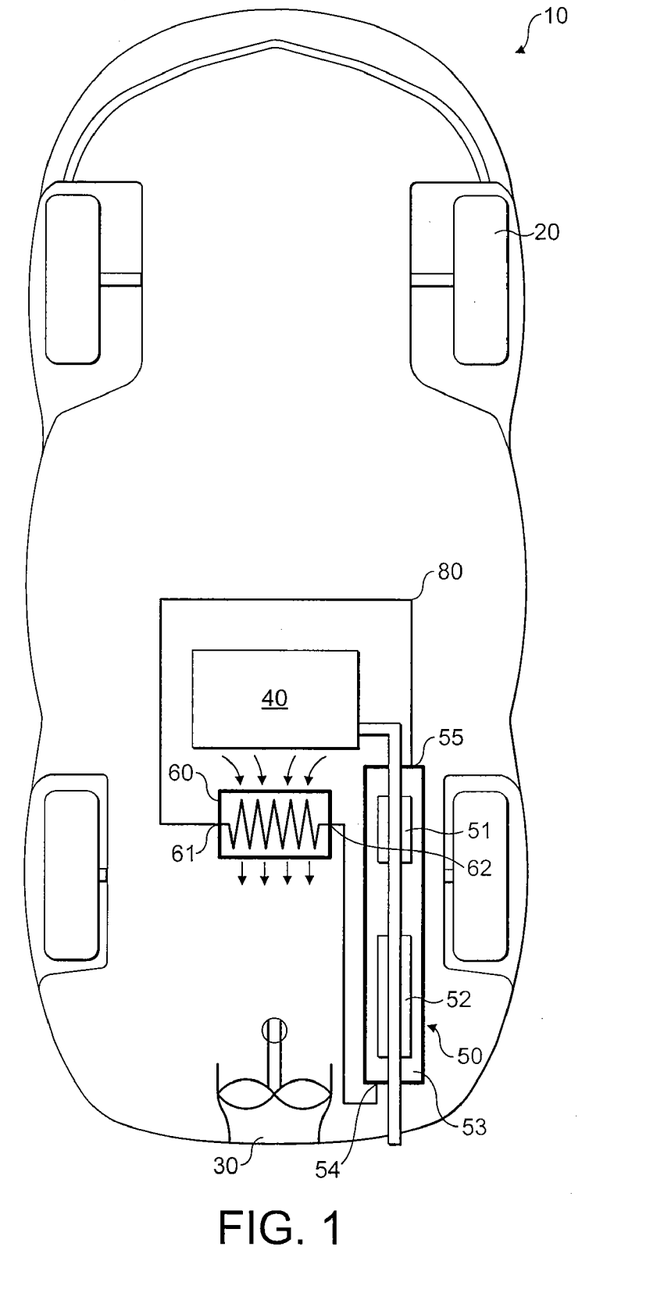
FIG. 1 is a schematic plan view illustrating a cooling system according to a first embodiment of the present invention installed in a sports car variant of amphibious vehicle.
Figure 2:
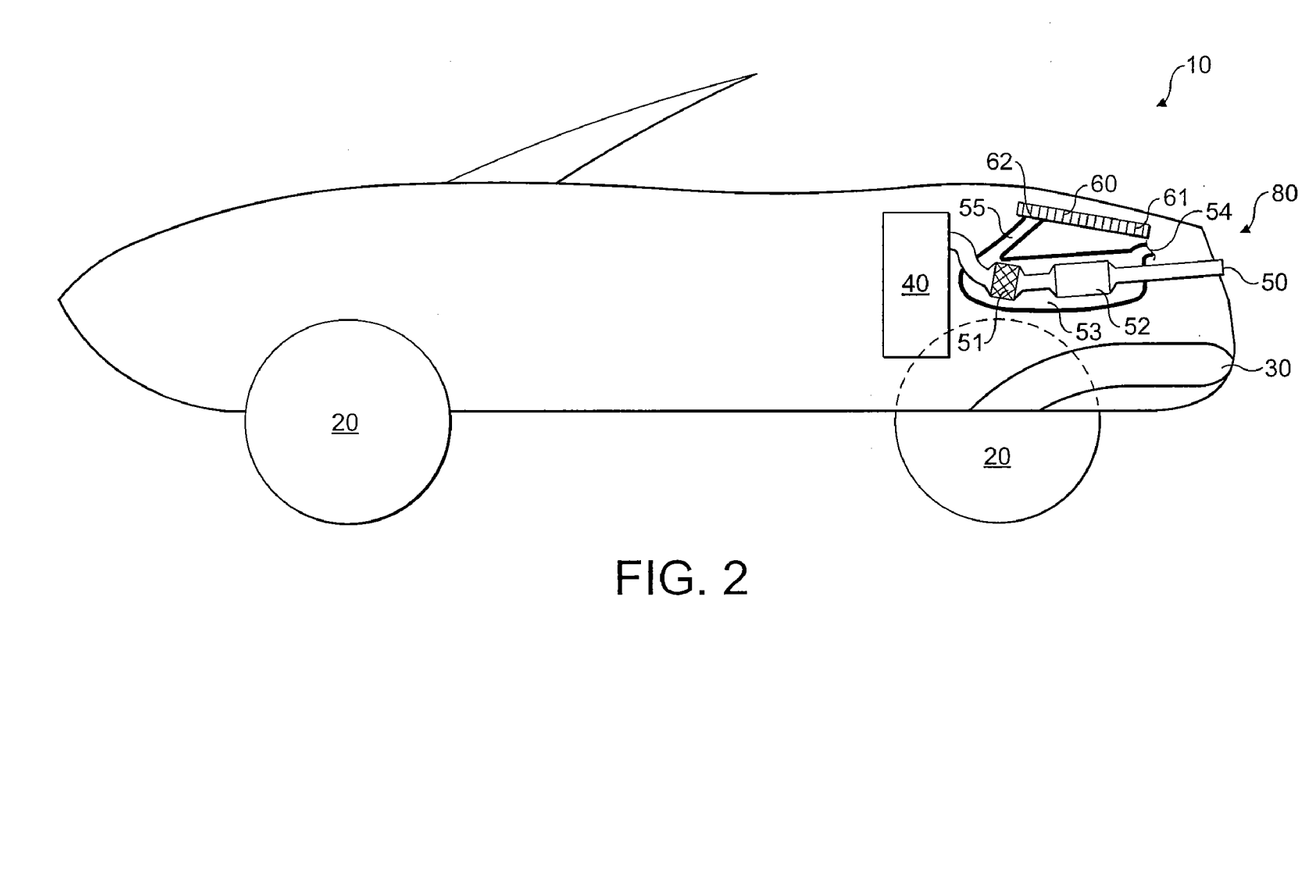
FIG. 2 is a schematic side elevation view of the amphibious vehicle of FIG. 1.

Referring first to FIGS. 1 and 2, there is illustrated a schematic view of a cooling system according to a first embodiment of the present invention installed in an amphibious vehicle 10. A prime mover 40 provides power for propelling the amphibious vehicle 10 when operating in land and marine modes. In land mode, power is delivered to a land propulsion means such as, for example, road wheels 20. In marine mode, power is delivered to a marine propulsion means such as, for example, a jet drive 30. In this preferred embodiment, the prime mover 40 is an internal combustion engine from which the products of combustion leave via an exhaust system 50.

The exhaust system 50 comprises a catalytic converter 51 and a silencer 52, each enclosed within a water jacket 53. The water jacket 53 has a liquid inlet 54 at a first distal end of the exhaust system 50 and a liquid outlet 55 at a second proximal end.

An air-water heat exchanger 60 in the form of a conventional radiator is provided and has a liquid inlet 61 and a liquid outlet 62. An elongate conduit for coolant liquid connects liquid inlet 61 with liquid outlet 62 and is packaged in a serpentine, labyrinthine or other such tortuous form so as to maximise the length of flow path between liquid inlet 61 and liquid outlet 62. This conduit is provided with a matrix of fins arranged in thermal contact on its outer surface such that a large surface area is presented to passing air to maximise the thermal pathway available and heat transfer possible between the cooling air passing through the matrix and the coolant liquid passing through the conduit A closed coolant liquid circuit 80 is formed by the series connection of the water jacket 53 of the exhaust system 50 and the air-water heat exchanger 60.

In operation, coolant liquid may be simply pumped around the closed coolant liquid circuit 80 or pumped under thermostatic and/or other control regimes as is well known in the art (e.g. under the control of an electronic control unit (ECU) dependent upon vehicle operating parameters). When the amphibious vehicle is operated, coolant liquid at a first cooled temperature enters the exhaust system 50 via liquid inlet 54 and passes along the water jacket 53 containing the exhaust system 50, passing from the cooler end of the exhaust system 50 at the rear of the vehicle 10 to the hotter end near the exhaust manifold(s) (so as to avoid quenching of the exhaust system and to prevent the formation of condensation in the exhaust manifold following a cold start). The heat present in the exhaust system 50 is transferred to the coolant liquid via the established heat transfer pathway, heating the coolant liquid and cooling the exhaust system 50. Coolant liquid at a second elevated temperature leaves the water jacket 53 via liquid exit 55. The coolant liquid next passes through a connecting conduit to the air-water heat exchanger 60, entering via liquid inlet 61. As the coolant passes along the conduit within the heat exchanger 60, air passing over the matrix of fins arranged in thermal contact with the conduit draws heat from the coolant liquid at the second elevated temperature, thereby cooling the coolant liquid to a temperature below the second elevated temperature. The passing of air over the matrix of fins may be free-flow (ram effect), via ducted means (to increase the ram effect) and/or may be forced or supplemented by way of means such as an auxiliary fan (not shown). The coolant then leaves the heat exchanger 60 via liquid exit 62 and a conduit conveys the coolant liquid to the liquid inlet 54 of the exhaust system and the above process is repeated, with the coolant liquid being re-circulated.

Figure 3:
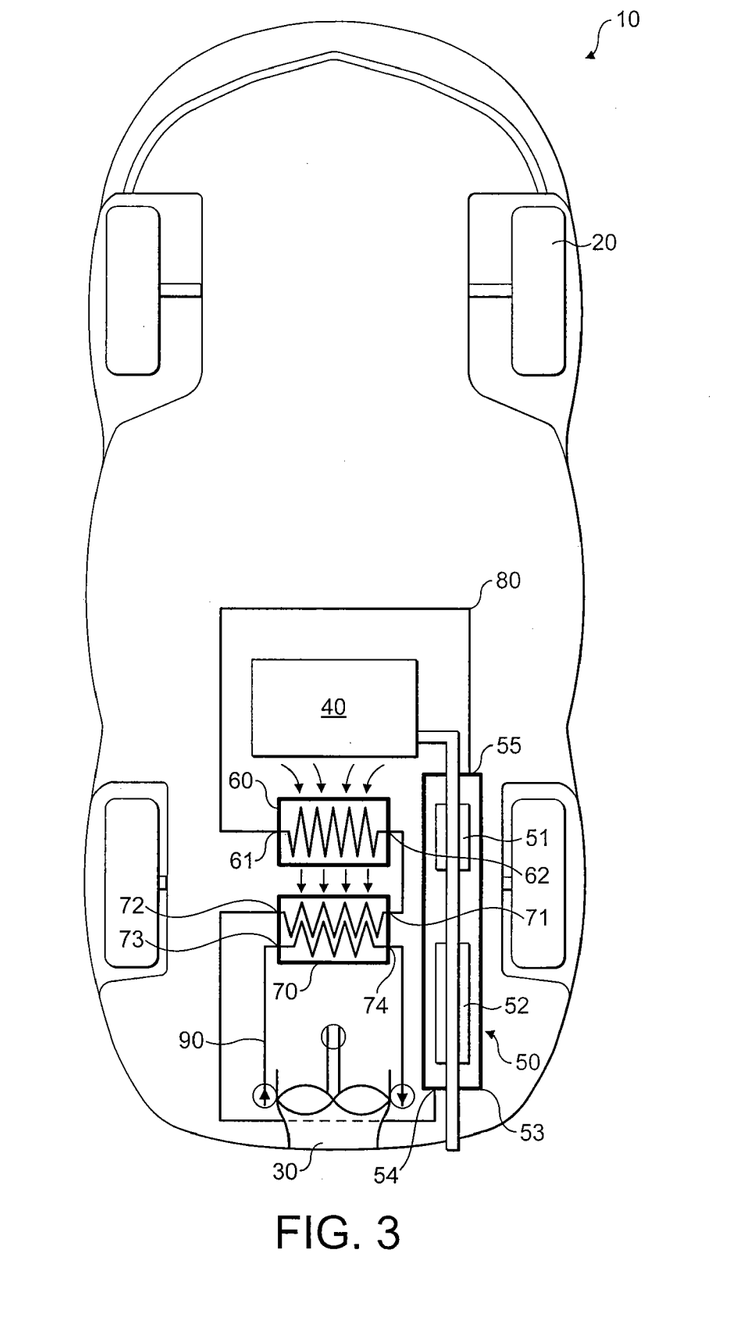
FIG. 3 is a schematic plan view illustrating a cooling system according to a second embodiment of the present invention installed in a sports car variant of amphibious vehicle.
Figure 4:
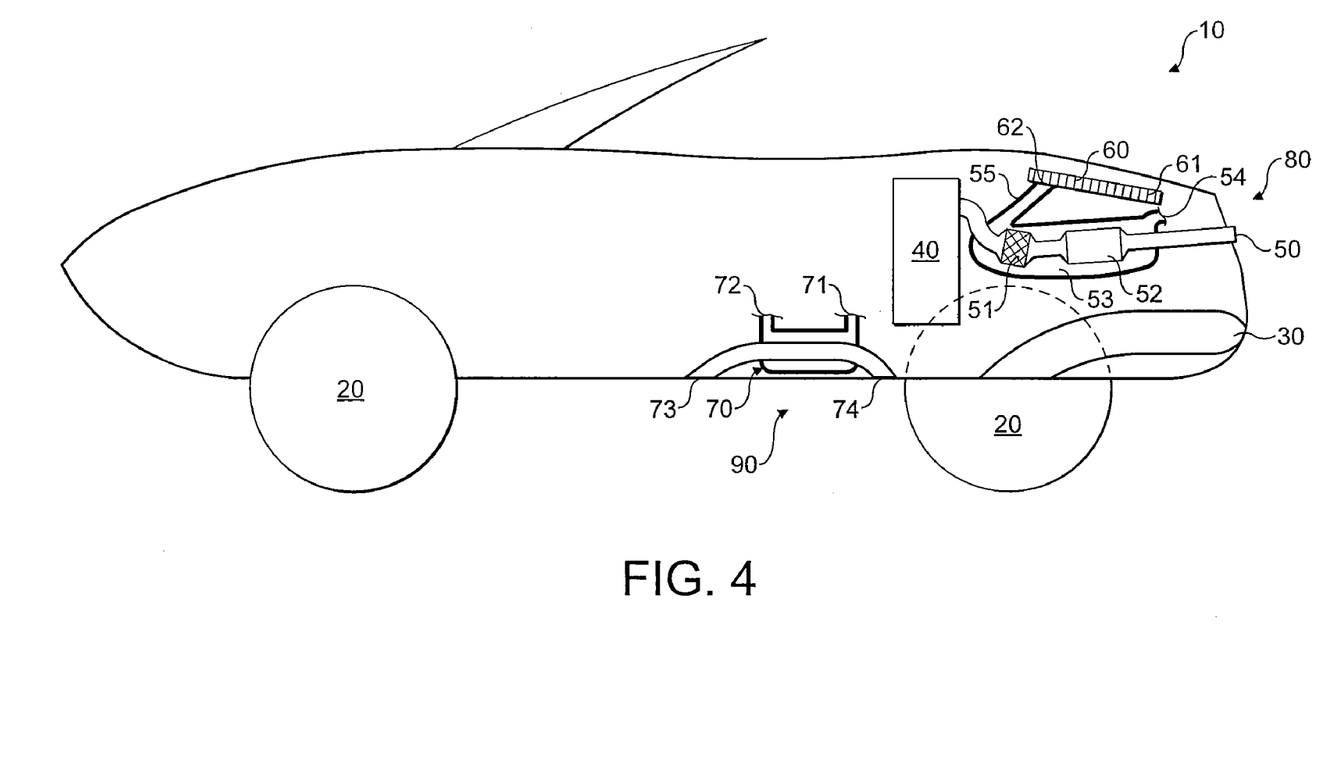
FIG. 4 is a schematic side elevation view of the amphibious vehicle of FIG. 3.

In FIGS. 3 and 4, a schematic view of cooling system according to a second embodiment of the present invention is illustrated. This second embodiment differs from the first only in that a water-water heat exchanger 70 is provided in addition to the air-water heat exchanger 60. The water-water heat exchanger has two liquid inlets 71, 73 and two liquid outlets 72, 74 and is located between the air-liquid heat exchanger 60 and the water jacket 53 of the exhaust system 50 (although it could be located at any position in the circuit). A first conduit for coolant liquid connects liquid inlet 71 with liquid outlet 72 and is packaged in a serpentine, labyrinthine or other such tortuous form, again so as to maximise the length of flow path between liquid inlet 71 and liquid outlet 72. A second conduit for raw water connects liquid inlet 73 with liquid outlet 74 and is likewise packaged in a serpentine, labyrinthine or other such tortuous form so as to maximise the length of flow path between liquid inlet 73 and liquid outlet 74. These conduits are arranged relative to one another so as to maximise the thermal pathway available between the two conduits and heat transfer possible between the cooling raw water passing through the second conduit and the coolant liquid passing through the first conduit.

A closed coolant liquid circuit 80 is formed by the series connection of the water jacket 53 of the exhaust system 50, the air-water heat exchanger 60 and the first conduit of the water-water heat exchanger 70 using appropriate liquid conduits. An open raw water circuit 90 is formed using appropriate liquid conduits and in marine mode raw water enters or is pumped from outside the amphibious vehicle 10, via a screen or filter (not shown), through the second conduit of the water-water heat exchanger 70, and back out into the external water source. The raw water may be sourced, for example, from the pressurised side of the jet drive 30 to avoid the need for a separate pump.

When the amphibious vehicle 10 is operated, the process as described in the first embodiment above is identical except that the cooling step provided by the air-water heat exchanger 60 is either supplemented or replaced with a cooling step effected as the coolant liquid passes through the water-water heat exchanger 70. Coolant liquid enters the water-water heat exchanger 70 either at an elevated temperature as compared to the first cooled temperature (in the case that the air-water heat exchanger 60 is effective to one degree or other) or at the second elevated temperature (in the case that the air-water heat exchanger 60 is not effective) and passes along the first conduit within the heat exchanger 70. At the same time, raw water at external ambient water temperature is pumped in from outside the amphibious vehicle 10 (or from an onboard store) via raw water liquid inlet 73. This raw water passes through the second conduit within the water-water heat exchanger 70 and leaves via raw water liquid exit 74 and is discharged back into the outside body of water (or back to the onboard store). The arrangement of the first and second conduits (reverse flow with respect to one another) maximises the thermal pathway available between the two conduits and the resultant heat transfer possible, such that the coolant liquid is cooled as the raw water is heated to an extent where the coolant liquid leaves via liquid exit 72 at a temperature below the second elevated temperature. The coolant liquid is then re-circulated.

It will be appreciated that the preferred embodiments of the present invention described above are just examples of many different layouts possible in accordance with the present invention. In particular, the preferred embodiments described adopts a layout suitable for a mid-engined sports car version of amphibious vehicle 10. In this version of amphibious vehicle 10, it is preferable to have the exhaust cooling system according to the present invention packaged as illustrated. However, the exhaust cooling system according to the present invention is very flexible and adaptable for packaging in very different types of amphibious vehicle such as, for example, a trike, a quad-bike, or an off-road utility vehicle.

Figure 5:
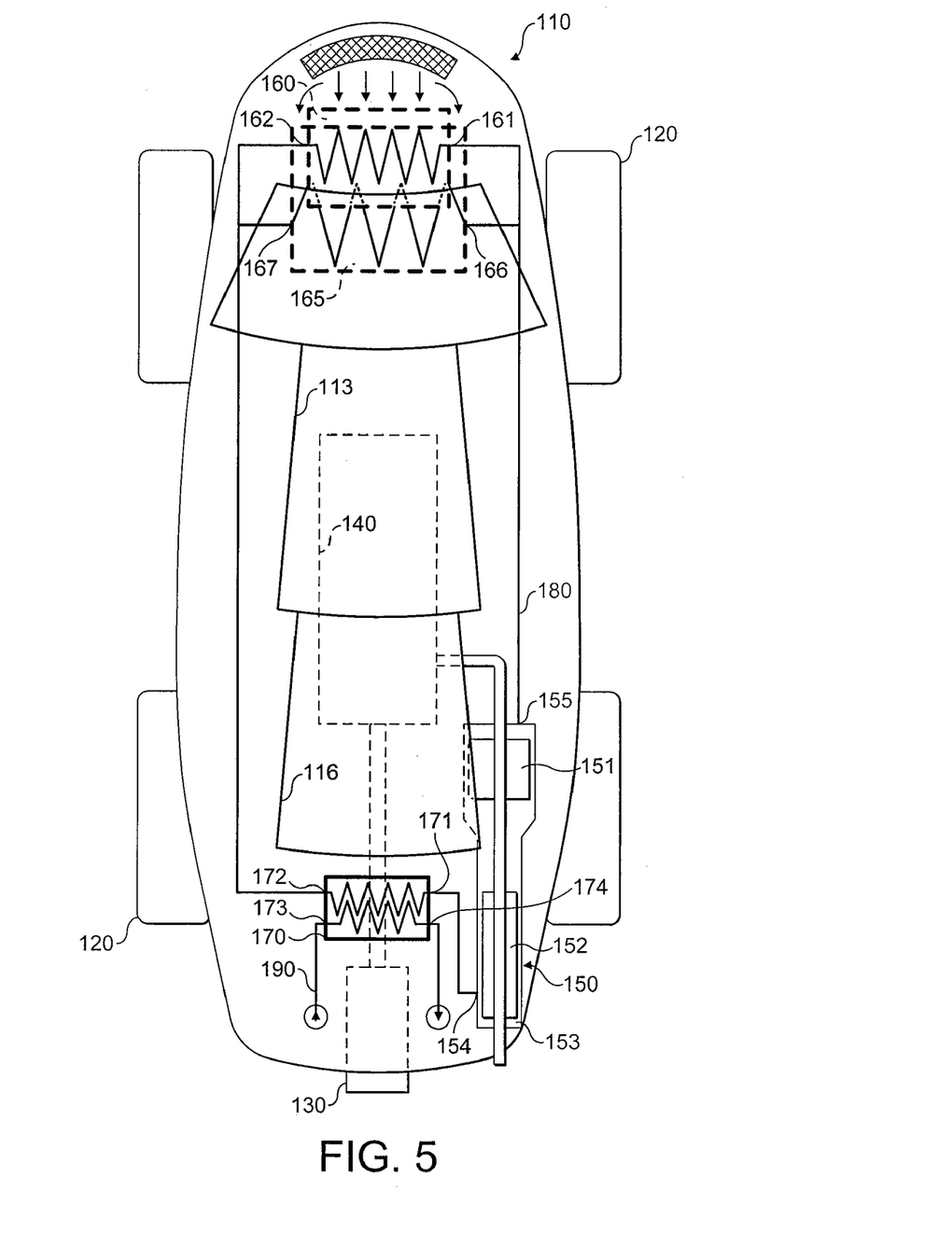
FIG. 5 is a schematic plan view illustrating a cooling system according to a third embodiment of the present invention installed in a quad bike variant of amphibious vehicle.
Figure 6:
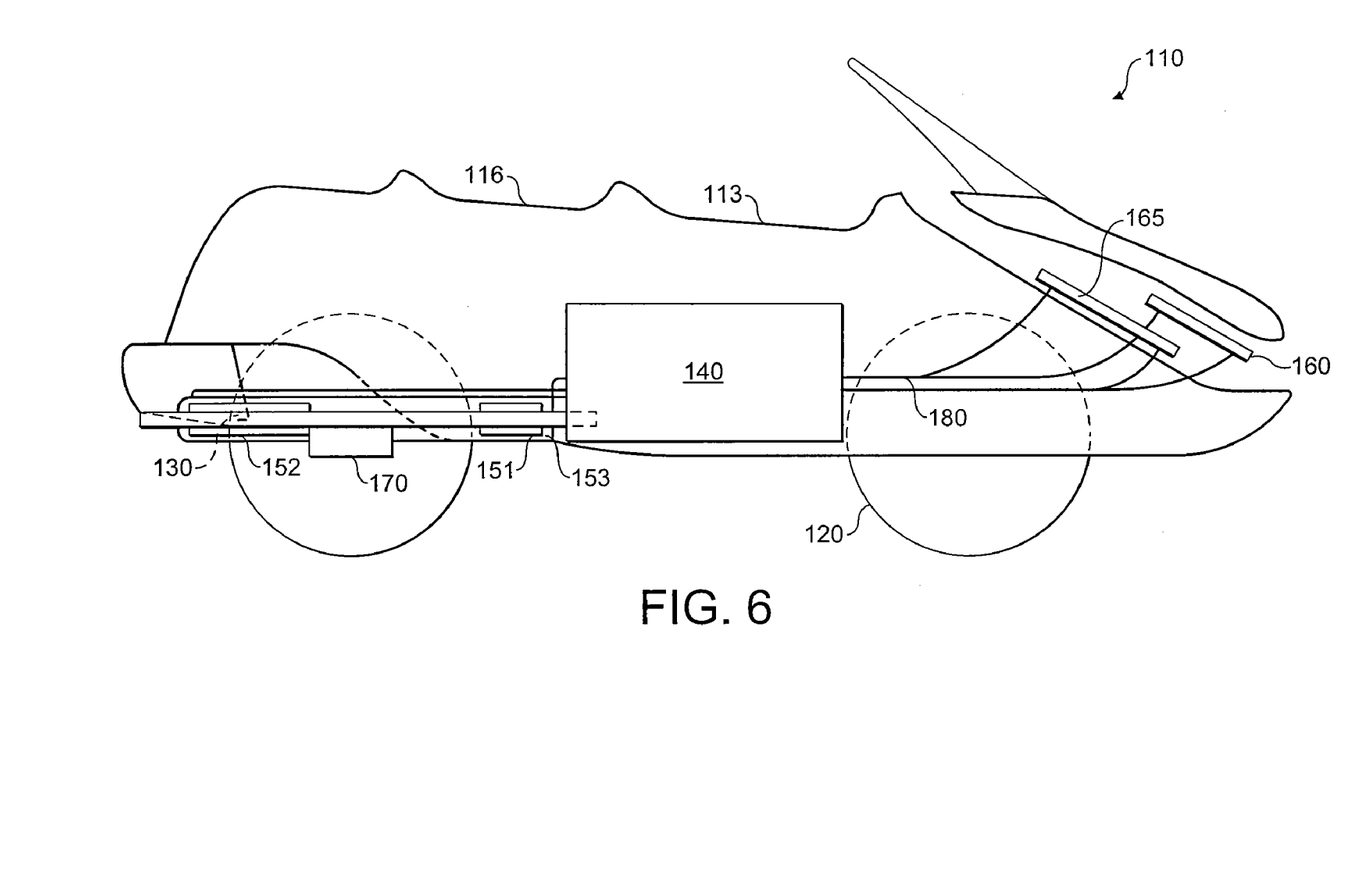
FIG. 6 is a schematic side elevation view of the amphibious vehicle of FIG. 5.

To exemplify this, FIGS. 5 and 6 illustrate a schematic view of a cooling system according to a third embodiment of the present invention installed in an amphibious vehicle 110 of quad-bike form. This is a 'sit astride' vehicle with a front seat 113 and a rear seat 116 arranged in tandem. As in the first embodiment described above, a prime mover 140 provides power for propelling the amphibious vehicle 110 when operating in land and marine modes. In land mode, power is delivered to a land propulsion means such as, for example, road wheels 120. In marine mode, power is delivered to a marine propulsion means such as, for example, a jet drive 130. In this preferred embodiment, the prime mover 140 is an internal combustion engine from which the products of combustion leave via an exhaust system 150. The exhaust system 150 comprises a catalytic converter 151 and a silencer 152, each enclosed within a water jacket 153. The water jacket 153 has a liquid inlet 154 at a first distal end of the exhaust system 150 and a liquid outlet 155 at a second proximal end.

Two air-water heat exchangers 160, 165 in the form of conventional radiators (different sizes for packaging reasons) are provided and have respective liquid inlets 161, 166 and liquid outlets 162, 167. Elongate conduits for coolant liquid connect respective liquid inlets 161, 166 with respective liquid outlets 162, 167 and are each packaged in a serpentine, labyrinthine or other such tortuous form so as to maximise the length of flow path between liquid inlets 161, 166 and liquid outlets 162, 167. These conduits are provided with a matrix of fins arranged in thermal contact on their outer surfaces such that a large surface area is presented to passing air to maximise the thermal pathway available and heat transfer possible between the cooling air passing through the matrices and the coolant liquid passing through the conduits. These two air-water heat exchangers 160, 165 are connected in parallel in the Figures, but it will be appreciated that alternatively they may be connected in series.

Optionally, a water-water heat exchanger 170 may be provided and, as shown, has two liquid inlets 171, 173 and two liquid outlets 172, 174. A first conduit for coolant liquid connects liquid inlet 171 with liquid outlet 172 and is packaged in a serpentine, labyrinthine or other such tortuous form again so as to maximise the length of flow path between liquid inlet 171 and liquid outlet 172. A second conduit for raw water connects liquid inlet 172 with liquid outlet 174 and is likewise packaged in a serpentine, labyrinthine or other such tortuous form so as to maximise the length of flow path between liquid inlet 172 and liquid outlet 174. These conduits are arranged relative to one another so as to maximise the thermal pathway available between the two conduits and heat transfer possible between the cooling raw water passing through the second conduit and the coolant liquid passing through the first conduit.

A closed coolant liquid circuit 180 is formed by the series connection of the water jacket 153 of the exhaust system 150, the air-water heat exchangers 160, 165 and, if provided, the first conduit of the water-water heat exchanger 70 using appropriate liquid conduits. In the embodiment illustrated, the air-water heat exchangers 160, 165 are themselves connected in parallel to one another, but alternatively could be connected in series. An open raw water circuit 190 is formed using appropriate liquid conduits and in marine mode raw water is pumped from outside the amphibious vehicle 110, via a screen or filter (not shown), through the second conduit of the water-water heat exchanger 170, and back out into the external water source.

Operation of the exhaust cooling system is as described above for the first and second embodiments, save for the coolant liquid passing through the two air-water heat exchangers 160, 165 in parallel.

In all embodiments described above, a closure means, e.g. hinged or sliding flaps, may be provided to protect the air-liquid heat exchanger(s) from water, wave strikes, and flotsam and jetsam encountered when operating the amphibious vehicle. The closure means can provide selective or total shielding of the air-liquid heat exchanger(s), and this may be controlled automatically (e.g. by ECU) or manually as operating conditions necessitate. The closure means may be used to protect the heat exchanger(s) from damage and/or to control or optimise the cooling regime.

It will be appreciated that whilst in the preferred embodiment described, the component parts and coolant flow paths are arranged in particular layouts, many different layouts are possible. For example, in an alternative embodiment, the present invention may make use of an air-water heat exchanger already present for cooling of an engine. Alternatively, the air-water heat exchanger as described in the preferred embodiment may be provided in addition to the air-water heat exchanger provided for an engine. Indeed, a plurality of air-water heat exchangers (e.g. smaller units) may be provided for packaging or other reasons and distributed around the vehicle. Likewise, where included, a plurality of water-water heat exchangers may be provided and distributed accordingly. Alternatively, the air-water heat exchanger(s) may be replaced by one or more water-water heat exchanger(s). Whilst the component parts of the circuit shown in the preferred embodiment are arranged in series with the coolant liquid being pumped around the circuit in series, it will be appreciated that component parts may be arranged in parallel in addition to or in place of the existing arrangement. Furthermore, each heat exchanger (whether of the air-water or water-water type) may be provided in a separate circuit having its own or shared coolant liquid. In such a case, each circuit may be provided with its own separate water jacket, have access to a portion or sub-circuit within a common water jacket, or have access to a single common water jacket under the control of a flow control system. Also, it is of course possible to introduce control valves for controlling the flow of coolant liquid in any one or more of the circuits provided and this may be managed by electrically operated or thermostatically controlled flow valves and associated electronic processing/control means, such as, for example an electronic control unit (ECU) provided as part of or in addition to an already existing ECU of the amphibious vehicle 10. This provides the facility to switch individual components in and out of the or each circuit as necessary to optimise performance of the system. Optionally, by-pass conduits may be provided for each component.

Whilst the air-water and water-water heat exchangers 60, 160, 165 and 70, 170 described above are of conventional design, it will be appreciated that alternative or bespoke designs may be beneficially employed. For example, the applicant has designed a bespoke water-water heat exchanger which is incorporated in the hull of one of its amphibious vehicle designs. The amphibious vehicle in question comprises a hull formed from aluminum, a good thermal conductor. A longitudinal section of the hull is closed off to form a closed volume, the hull forming one side of this closed volume. Coolant liquid may be pumped through the closed volume and when the amphibious vehicle is operating in the marine mode the coolant liquid is cooled by external raw water which is in direct contact with the hull surface. This design does away with the need to source raw water from outside of the vehicle, and thus there is no need for the raw water circuit 90 in the preferred embodiment described above. This design of water-water heat exchanger has proved so effective that the rate of flow of coolant liquid through the closed volume has had to be metered to keep the engine at an efficient working temperature. It may therefore be preferred to fit a bypass circuit to the water-water heat exchanger to allow it to be switched out, for example while the engine is warming up. Such a bypass could be controlled manually, thermostatically, by a timer switch, or by any other suitable control means (e.g. an ECU). Alternatively or additionally to the above, a water-water heat exchanger may be embodied in an existing apparatus of the vehicle, such as the jet drive 30, for example. Cooling liquid may be circulated within or around components of the jet drive 30 and/or tines within a stone guard for the jet drive 30. Large volumes of raw water at ambient temperature pass these components which are manufactured from metals which are good thermal conductors. Furthermore, additional cooling may be provided by injecting raw water directly into the exhaust stream of exhaust gas passing through and out of the exhaust system.

It will be appreciated that the prime mover 40, 140 can take the form of any of a number of internal combustion engines, such as a piston engine, turbine or rotary. Furthermore, whilst the cooling system is presented as one for cooling an exhaust system, it could also be employed to cool other heat generating sources such as, for example, the marine propulsion means 30, 130, the prime mover 40, 140 and/or braking components.

Furthermore, the prime mover 40, 140 may be mounted transversely as shown in FIGS. 1 and 2 and as described in the applicant's co-pending application published as WO 02/07999; or longitudinally, as is found convenient. An example of a power train comprising a longitudinally mounted prime mover may be found in the applicant's co-pending application published as WO 02/12005.

As described above, the coolant liquid circulates around the closed circuit 80, 180 whilst the raw water is pumped in and out of the open circuit 90, 190 when available (i.e. in the marine mode). Because the coolant liquid is separated from the raw water and retained always in the closed circuit 80, 180, antifreeze and its associated corrosion inhibitors may be used in the coolant liquid to protect the system components against low temperature and corrosive effects. For environmental reasons, this would not be possible in the case of known marine vessel exhaust cooling systems which pump all of the coolant back into the raw water source. However, if it is desired to provide additional cooling when operating the vehicle 10, 110 in land mode, the system may be arranged to retain raw water in the open circuit 90, 190 and/or closed circuit 80, 180 when the vehicle is driven on land. Such a system may have added benefits in terms of providing ballast which can be controllably distributed around the vehicle to further optimise performance, for example. In this case, safety devices could be provided to protect the system against frost damage in case raw water is accidentally retained during cold atmospheric conditions. For example, bursting discs could be provided to relieve excess pressure as is known in the design and operation of chemical process plants.

It will be appreciated that the closed circuit 80, 180 need not necessarily be a closed circuit in the case where antifreeze and its associated corrosion inhibitors are not required to be present in the coolant liquid. In such a case raw water may instead be drawn in, circulated around the so-called closed circuit 80, 180 and either retained for further circulation or dispensed back into the raw water source. In the case where raw water is retained for further circulation (for land mode operation of the vehicle, for example) bursting discs or other sacrificial elements may be employed in the closed circuit for safety reasons as described above. In a yet further embodiment, preferably when the vehicle is operating in the marine mode, raw water may be drawn in and passed directly through the water jacket 53, 153 of the exhaust system 50, 150 only before being dispensed back into the raw water source. This provides cooling of the exhaust system 50, 150 without the need for circulation of coolant liquid around the remainder of the closed circuit 80, 180. Such an arrangement may be achieved using flow control valves, for example.

Whilst in the preferred embodiments described above cooling of the exhaust system 50, 150 is achieved using a coolant liquid which is passed through a water jacket 53, 153 directly enclosing components of the exhaust system 50, 150, it will be appreciated that the apparatus employed to effect this heat transfer and control thereof may take any suitable form. For example, the water jacket 53, 153 need not enclose all components of the exhaust system. Instead, only a selected component or selection of components may be enclosed. Indeed, a plurality of separate water jackets may be beneficially employed, each separately enclosing one or more components. Each water jacket may be selectively 'plumbed' in and out of a circuit using control valves or other flow control means. Furthermore, the or each water jacket may be thermally insulated to one degree or other from components of the exhaust system and/or designed so as to prevent coolant liquid coming into direct contact with them. This may be achieved, for example, by providing an air, gas or liquid filled gap directly between the water jacket and an exhaust component (e.g. using ribs, fins or other structural members to achieve a fixed (linear or graduated) spatial relationship therebetween). Such an air, gas or liquid filled gap may additionally or alternatively be partially or completely filled or lagged with an insulating material. Each of these alternatives may be employed separately or in combination to optimise the exhaust cooling regime of the vehicle. It will be appreciated also that control of the flow of coolant liquid is imperative in optimising the cooling regime and in particular for optimal cooling of each separate component in the exhaust system during different modes such as land mode, marine mode, vehicle start up, normal running and vehicle shut down. The catalytic converter is one such component for which optimal operating parameters are critical. It is also important to control cooling of exhaust manifolds to prevent condensation and sediment build up. Furthermore, thermal shock effects on exhaust components must be taken into consideration.

The exhaust cooling system according to the present invention may be particularly advantageously applied to a planing amphibious vehicle; and further to such a vehicle having wheels which are retractable when the vehicle is driven over water in a marine mode. Control aspects of the exhaust cooling system may be linked into a vehicle control system which offers a land mode and a distinct marine mode. It may also be particularly advantageous for the exhaust cooling system according to the present invention to cool the engine exhaust manifolds in a controlled manner to prevent the formation of condensation in the exhaust manifold following a cold start.

Whilst the heat exchangers described herein have been referred to as 'air-water' and 'water-water' heat exchangers, it will be appreciated that the term 'water' infers the use of any suitable liquid, e.g. water provided with antifreeze and associated corrosion inhibitors.

While a particular form of the present invention has been illustrated and described, it will also be apparent to those skilled in the art that various modifications can be made without departing from the spirit and scope of the present invention. Accordingly, it is not intended that the invention be limited except by the appended claims.

What is claimed is:

1. An exhaust cooling system of an amphibious vehicle operable in land and marine modes, the exhaust cooling system comprising:
   an exhaust system to be cooled;
   at least one air-liquid heat exchanger; and
   a first coolant liquid in thermal communication with the exhaust system and the at least one air-liquid heat exchanger, wherein
   when the amphibious vehicle is operated the first coolant liquid is heated by the exhaust system, and cooled by the at least one air-liquid heat exchanger.

2. An exhaust cooling system as claimed in claim 1 further comprising at least one liquid-liquid heat exchanger in thermal communication with the first coolant liquid, wherein when the amphibious vehicle is operated the first coolant liquid may be cooled by the at least one liquid-liquid heat exchanger.

3. An exhaust cooling system as claimed in claim 1 wherein the exhaust system to be cooled comprises at least one exhaust manifold and at least one silencer.

4. An exhaust cooling system as claimed in claim 3 wherein the exhaust system further comprises at least one catalytic converter.

5. An exhaust cooling system as claimed in claim 1 wherein the at least one air-liquid heat exchanger is located in a duct provided within the vehicle bodywork.

6. An exhaust cooling system as claimed in claim 5 wherein the duct has an air inlet and an air outlet and the air inlet at least is located above a static water line.

7. An exhaust cooling system as claimed in claim 5 wherein the duct further comprises a closure means for selective and controllable closure of at least one of said air inlet and air outlet.

8. An exhaust cooling system as claimed in claim 7 wherein the closure means comprises at least one hinged flap.

9. An exhaust cooling system as claimed in claim 5 wherein the duct is sealed off from at least one other internal compartment provided within the vehicle.

10. An exhaust cooling system as claimed in claim 1 further comprising at least one fan provided for increasing the air flow available to the at least one air-liquid heat exchangers.

11. An exhaust cooling system as claimed in claim 1 wherein at least one air-liquid heat exchanger is provided at the front of the vehicle.

12. An exhaust cooling system as claimed in claim 1 wherein at least one air-liquid heat exchanger is provided at the rear of the vehicle.

13. An exhaust cooling system as claimed in claim 1 wherein the exhaust system to be cooled and the at least one air-liquid heat exchanger are connected in series using conduits through which the coolant liquid circulates.

14. An exhaust cooling system as claimed in claim 1 wherein the coolant liquid is contained within and re-circulates around a closed circuit formed by the series connection of the exhaust system to be cooled and the at least one air-liquid heat exchanger.

15. An exhaust cooling system as claimed in claim 2 wherein the liquid-liquid heat exchanger is cooled using raw water from outside the vehicle.

16. An exhaust cooling system as claimed in claim 15 wherein the raw water is drawn from an external raw water source and returned to the raw water source outside the vehicle after use.

17. An exhaust cooling system as claimed in claim 15 wherein the raw water is pumped in, through and out of the liquid-liquid heat exchanger.

18. An exhaust cooling system as claimed in claim 15 wherein the raw water is sourced from a pressurised side of a jet drive marine propulsion means provided in the amphibious vehicle.

19. An exhaust cooling system as claimed in claim 2 wherein the at least one liquid-liquid heat exchanger is formed at least in part using an external hull surface of the amphibious vehicle.

20. An exhaust cooling system as claimed in claim 19 wherein the external hull surface of the amphibious vehicle used in the liquid-liquid heat exchanger is formed from a good thermal conductor.

21. An exhaust cooling system as claimed in claim 20 wherein the external hull surface of the amphibious vehicle comprises aluminum.

22. An exhaust cooling system as claimed in claim 19 wherein the coolant liquid contacts the inside surface of the hull and is cooled by the external raw water source present on the outside surface of the hull in which the vehicle is operating when in marine mode.

23. An exhaust cooling system as claimed in claim 19 wherein the raw water source required and used for cooling the liquid-liquid heat exchanger remains outside the vehicle.

24. An exhaust cooling system as claimed in claim 2 wherein at least one of the liquid-liquid heat exchangers may be bypassed.

25. An exhaust cooling system as claimed in claim 2 wherein at least one liquid-liquid heat exchanger is formed at least in part using a component of the marine propulsion means.

26. An exhaust cooling system as claimed in claim 25 wherein the marine propulsion means comprises a jet drive.

27. An exhaust cooling system as claimed in claim 25 wherein the at least one liquid-liquid heat exchanger is cooled using raw water passing over the marine propulsion means.

28. An exhaust cooling system as claimed in claim 1 wherein additional cooling of the exhaust system is provided by injecting raw water directly into the exhaust stream of exhaust gas passing through and out of the exhaust system.

29. An exhaust cooling system as claimed in claim 1 wherein additional cooling of the exhaust system is provided by sourcing raw water which is passed along the exhaust system, in direct thermal communication therewith, and then exhausted back to the raw water source.

30. An exhaust cooling system of an amphibious vehicle operable in land and marine modes, the exhaust cooling system comprising:
   an exhaust system to be cooled;
   at least one liquid-liquid heat exchanger; and
   a first coolant liquid in thermal communication with the exhaust system and the at least one liquid-liquid heat exchanger, wherein when the amphibious vehicle is operated the first coolant liquid is heated by the exhaust system and cooled by the at least one liquid-liquid heat exchanger.

31. An exhaust cooling system as claimed in claim 30 further comprising at least one air-liquid heat exchanger in thermal communication with at least one of said coolant liquids, wherein when the amphibious vehicle is operated at least one of said coolant liquids may be cooled by the at least one air-liquid heat exchanger.

32. An exhaust cooling system as claimed in claim 1 wherein the system is additionally employed to cool other heat generating sources.

33. An exhaust cooling system as claimed in claim 32 wherein the other heat generating sources are selected from the group consisting of a marine propulsion means, a prime mover and braking components.

34. An exhaust cooling system as claimed in claim 2 wherein the heat exchangers are provided in a common circuit having shared coolant liquid.

35. An exhaust cooling system as claimed in claim 2 wherein each heat exchanger is provided in a separate circuit.

36. Use of an exhaust cooling system as claimed in claim 1 in a planing amphibious vehicle.

37. Use of an exhaust cooling system as claimed in claim 1 in a planing amphibious vehicle having at least one retractable wheel.

38. An exhaust cooling system as claimed in claim 1 further comprising at least one liquid-liquid heat exchanger in thermal communication with a second coolant liquid, wherein when the amphibious vehicle is operated the second coolant liquid may be cooled by the at least one liquid-liquid heat exchanger.

39. An exhaust cooling system as claimed in claim 38 wherein at least one of the liquid-liquid heat exchangers may be bypassed.

40. An exhaust cooling system as claimed in claim 7 wherein the closure means comprises at least one sliding member.

41. An exhaust cooling system as claimed in claim 25 wherein the at least one liquid-liquid heat exchanger is cooled using raw water passing through the marine propulsion means.

* * * * *